US011993074B2

(12) United States Patent
Takahashi

(10) Patent No.: US 11,993,074 B2
(45) Date of Patent: May 28, 2024

(54) PRINTING DEVICE INCLUDING DETACHABLE DISCHARGE TRAY POSITIONED BELOW CUTTER UNIT

(71) Applicant: BROTHER KOGYO KABUSHIKI KAISHA, Nagoya (JP)

(72) Inventor: Hiroaki Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/179,729

(22) Filed: Mar. 7, 2023

(65) Prior Publication Data

US 2023/0202216 A1 Jun. 29, 2023

Related U.S. Application Data

(62) Division of application No. 17/217,306, filed on Mar. 30, 2021, now Pat. No. 11,623,461.

(30) Foreign Application Priority Data

Mar. 30, 2020 (JP) ................................ 2020-061147

(51) Int. Cl.

| | |
|---|---|
| ***B41J 11/70*** | (2006.01) |
| ***B26D 1/18*** | (2006.01) |
| ***B65H 35/00*** | (2006.01) |
| ***B65H 37/06*** | (2006.01) |

(52) U.S. Cl.

CPC ............... *B41J 11/70* (2013.01); *B26D 1/185* (2013.01); *B65H 35/0086* (2013.01); *B65H 37/06* (2013.01)

(58) Field of Classification Search

CPC ......... B41J 11/70; B41J 13/106; B26D 1/185; B65H 37/06; B65H 35/0086

See application file for complete search history.

(56) References Cited

U.S. PATENT DOCUMENTS

| | | | |
|---|---|---|---|
| 4,768,063 | A | 8/1988 | Kunishima et al. |
| 8,272,797 | B2 | 9/2012 | Morimoto et al. |

(Continued)

FOREIGN PATENT DOCUMENTS

| | | | |
|---|---|---|---|
| CN | 102673187 | A | 9/2012 |
| CN | 108883642 | A | 11/2018 |

(Continued)

OTHER PUBLICATIONS

Notice of Reasons for Refusal dated Jul. 4, 2023 received in Japanese Patent Application No. JP 2022-556084.

(Continued)

*Primary Examiner* — Leslie A Nicholson, III

(74) *Attorney, Agent, or Firm* — Scully, Scott, Murphy & Presser, P.C.

(57) ABSTRACT

A printing device includes: an image recording unit configured to record an image on a printing medium; a cutter unit configured to cut the printing medium on which the image is recorded by the image recording unit; and a medium receiving unit configured to receive the printing medium on which the image is recorded by the image recording unit. The cutter unit is positioned frontward of the image recording unit in a frontward direction. The medium receiving unit is positioned below the cutter unit at a time of an image recording operation and being detachable in the frontward direction.

8 Claims, 10 Drawing Sheets

(56) References Cited

U.S. PATENT DOCUMENTS

| | | | |
|---|---|---|---|
| 9,002,257 B2 | 4/2015 | Saiga | |
| 9,022,550 B2 | 5/2015 | Nagashima | |
| 9,751,298 B2 | 9/2017 | Ueyama et al. | |
| 10,189,668 B2 | 1/2019 | Fukushima et al. | |
| 10,493,648 B2 * | 12/2019 | Nakatsu | B26D 1/205 |
| 10,787,009 B2 | 9/2020 | Kozuma et al. | |
| 11,491,808 B2 * | 11/2022 | Hayakawa | B41J 11/706 |
| 2009/0196672 A1 | 8/2009 | Morimoto et al. | |
| 2012/0140011 A1 | 6/2012 | Yamada et al. | |
| 2012/0204693 A1 | 8/2012 | Yoshida | |
| 2013/0195536 A1 | 8/2013 | Yoshinuma et al. | |
| 2014/0178117 A1 * | 6/2014 | Takei | B41J 11/70 400/621 |
| 2017/0008316 A1 | 1/2017 | Ueyama et al. | |
| 2019/0030924 A1 | 1/2019 | Takahashi | |
| 2021/0300081 A1 | 9/2021 | Takahashi | |

FOREIGN PATENT DOCUMENTS

| | | |
|---|---|---|
| JP | H08-141980 A | 6/1996 |
| JP | H10-258554 A | 9/1998 |
| JP | 2001-105677 A | 4/2001 |
| JP | 2001-162877 A | 6/2001 |
| JP | 2009179040 A | 8/2009 |
| JP | 2012-051122 A | 3/2012 |
| JP | 2012115952 A | 6/2012 |
| JP | 2013032193 A | 2/2013 |
| JP | 2013-111915 A | 6/2013 |
| JP | 2015-110471 A | 6/2015 |
| JP | 2017-19038 A | 1/2017 |
| JP | 2019-206138 A | 12/2019 |

OTHER PUBLICATIONS

Decision of Refusal dated Sep. 26, 2023 received in Japanese Patent Application No. JP 2022-556084.

International Search Report and Written Opinion dated Jun. 15, 2021 from related PCT/JP2021/013489.

Office Action dated Aug. 26, 2022 received in U.S. Appl. No. 17/217,306.

Notice of Allowance dated Dec. 8, 2022 received in U.S. Appl. No. 17/217,306.

First Office Action dated Feb. 8, 2024 received in Chinese Patent Application No. CN 202180023708.7.

* cited by examiner

PRINTING DEVICE INCLUDING DETACHABLE DISCHARGE TRAY POSITIONED BELOW CUTTER UNIT

REFERENCE TO RELATED APPLICATIONS

This application is a division of U.S. patent application Ser. No. 17/217,306, filed Mar. 30, 2021, which claims priority from Japanese Patent Application No. 2020-061147 filed Mar. 30, 2020. The entire contents of the aforementioned applications are incorporated herein by reference.

BACKGROUND ART

Technical Field

The present disclosure relates to a printing device.

Background

A conventional image-forming apparatus includes an image-forming unit for forming images on sheets, and a sheet conveying unit for conveying the sheets to the image-forming unit. When the image-forming apparatus receives a job, the sheet conveying unit conveys a sheet in a sheet cassette to the image-forming unit, and the image forming unit forms an image on the sheet. At this time, conceivably, there may be a case where the size of the sheet specified by the job may be smaller than the size of the sheet accommodated in the sheet cassette. In such cases, a user must reload a sheet having the size specified in the job, which is troublesome for the user.

Japanese Patent Application Publication No. 2017-019038 discloses a printing device including: a cutter unit that includes a cutter blade for cutting a printing medium and a holder for holding the cutter blade; and a printing unit for printing an image on the printing medium. According to this printing device, since the printing medium can be cut into a desired size by the cutter unit after image formation is performed on the printing medium, there is no need for the user to reload the sheet of the specified size.

DESCRIPTION

Summary

In the above-described printing device, a rail for the cutter blade is positioned below a conveying passage of the printing medium, and a cover is positioned above the rail. That is, in order to remove a sheet jammed near the cutter blade, the cover may be formed with an opening for allowing user's accessing to a region near the cutter blade, or the cover may be configured to be opened and closed relative to the cutter blade. As a result, such structure may render the printing device bulky and complicated in structure.

It is therefore an object of the present disclosure to overcome the above-described problem, and to provide a compact printing device with a simple structure capable of cutting a printing medium after image recoding is performed on the printing medium.

In order to attain the above and other objects, according to one aspect, the disclosure provides a printing device including an image recording unit, a cutter unit, and a medium receiving unit. The image recording unit is configured to record an image on a printing medium. The cutter unit is configured to cut the printing medium on which the image is recorded by the image recording unit. The cutter unit is positioned frontward of the image recording unit in a frontward direction. The medium receiving unit is configured to receive the printing medium on which the image is recorded by the image recording unit. The medium receiving unit is positioned below the cutter unit at a time of an image recording operation and being detachable in the frontward direction.

According to another aspect, the disclosure also provides a printing device including an upper housing, a lower housing, an image recording unit, a processing unit, a conveying unit, and a discharge tray. The lower housing is connected to the upper housing. The image recording unit is disposed in the lower housing and is configured to record an image on a printing medium. The processing unit includes a processing part configured to perform processing on the printing medium on which the image is recorded by the image recording unit. The conveying unit is disposed in the lower housing and is configured to convey the printing medium from the image recording unit to the processing unit in a conveying direction. The discharge tray is configured to receive the printing medium on which the processing is performed by the processing part. The discharge tray has a downstream and an upstream end opposite each other in the conveying direction. When the discharge tray is attached to the lower housing, the processing part is positioned below the upper housing and above the discharge tray in a vertical direction, and between the upstream end and the downstream end of the discharge tray in the conveying direction.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Hereinafter, a printing device 1 according to one embodiment of the present disclosure will be described with reference to FIGS. 1 through 9C.

<Structure of Printing Device 10>

Figure 1:
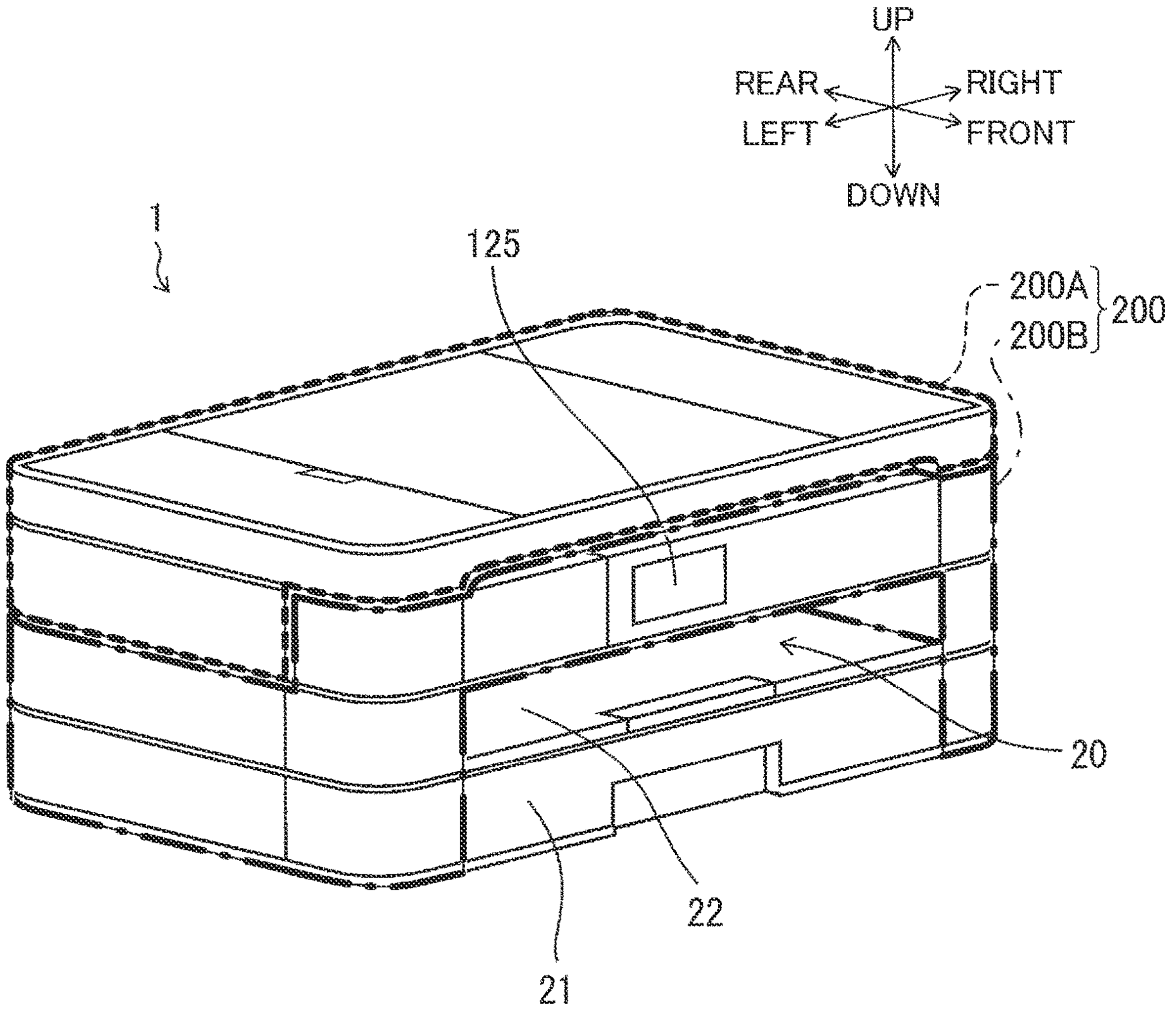
FIG. 1 is a view illustrating an external appearance of a printing device 1 according to one embodiment.
Figure 2:
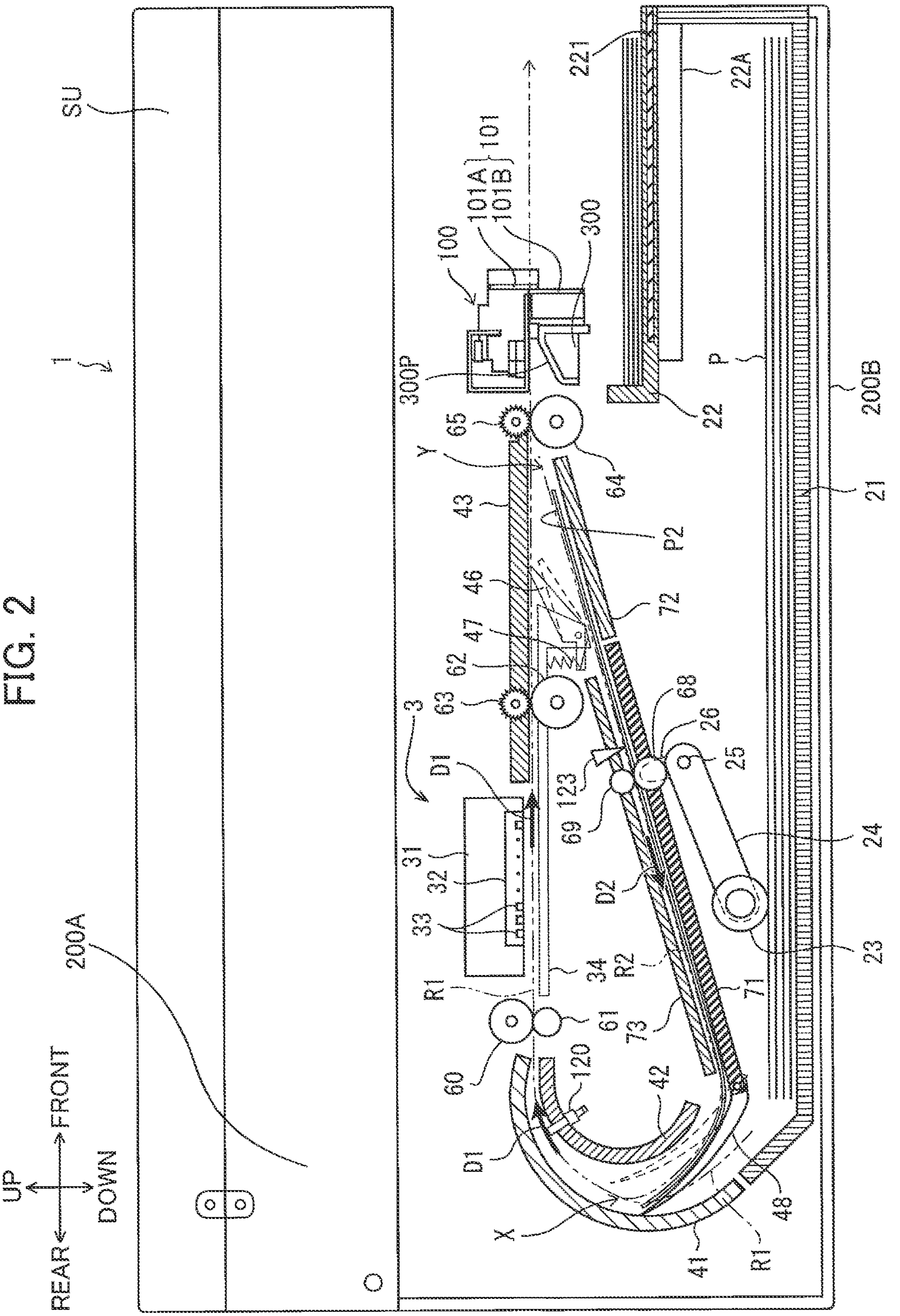
FIG. 2 is a conceptual cross-sectional view illustrating an internal configuration of the printing device 1 according to the embodiment.

FIG. 1 illustrates an external appearance of the printing device 1 according to the embodiment. FIG. 2 is a cross-sectional view illustrating an internal configuration of the printing device 1.

The printing device 1 illustrated in FIG. 1 is a multifunction peripheral (MFP) having a plurality of functions, such as a printing function, a scanning function, a copying function, and a facsimile function.

For the sake of convenience of the description, an upward/downward direction, a frontward/rearward direction, and a leftward/rightward direction with respect to the printing device 1 will be defined as indicated by arrows in FIG. 1.

The printing device 1 has a printing function using an inkjet type printing method for recording print data specified in a print job on sheets P by ejecting ink, for example. However, instead of the inkjet type printing method, by an electro-photographic type printing method is also available as the printing method. Further, the printing device 1 may be able to print color images or only monochromatic images on sheets P. The sheets P may be a paper medium or a resin medium such as transparency sheets.

As illustrated in FIG. 1, the printing device 1 includes a housing 200 configured of an upper housing 200A and a lower housing 200B. The upper housing 200A includes a scanner unit SU. The upper housing 200A has a rear end portion that is pivotably supported by the lower housing 200B (see FIG. 2). The lower housing 200B has a front surface formed with an opening 20. A sheet supply tray 21 and a discharge tray 22 are attachable to and detachable from the lower housing 200B through the opening 20. That is, the opening 20 is in communication with interiors of the sheet supply tray 21 and the discharge tray 22 those attached to the lower housing 200B, and functions as a passage for insertion and ejection of the sheet supply tray 21 and the discharge tray 22 relative to the lower housing 200B.

The sheet supply tray 21 is open upward and is configured to accommodate therein a plurality of sheets P in a stacked state. The sheet P may have the A4-size, for example. As illustrated in FIG. 2, the discharging tray 22 is positioned above the sheet supply tray 21 when attached to the lower housing 200B.

The discharge tray 22 is also open upward and is configured to receive the discharged sheets P (as well as a first sheet P1 and a second sheet P2 that have moved past a cutter unit 100). In the present embodiment, the discharge tray 22 is slidably movably mounted on a pair of discharge tray supports 22A of the lower housing 200B. That is, the discharge tray 22 is attachable to and detachable from the lower housing 200B independent of the attachment and detachment of the sheet supply tray 21 without interlocking relation. An extension tray 221 is provided on the discharge tray 22 such that the extension tray 211 is retractable relative to the discharge tray 22.

Each discharge tray support 22A is positioned, for example, at each inner side surface of the lower housing 200B to support each side portion in the leftward/rightward direction of the discharge tray 22. That is, in a state where the discharge tray 22 is detached from the lower housing 200B, each discharge tray support 22A exists only at each inner side surface of the lower housing 200B in a space below the cutter unit 100. Hence, the space below the cutter unit 100 is accessible to a user.

Incidentally, attachment and detachment of the sheet supply tray 21 and the discharge tray 22 to and from the lower housing 200B may be performed in interlocking relation, rather than independently of each other.

Specifically, in order to associate the attachment and detachment of the discharge tray 22 with the attachment and detachment of the sheet supply tray 21, a rear end of the discharge tray 22 may be pivotally movably connected to the sheet supply tray 21. In this case, a user may pivotally move the discharge tray 22 upward in a state where the sheet supply tray 21 is detached from the lower housing 200B, so that replenishment of the sheet P to the sheet supply tray 21 can be facilitated.

An operating unit 125 having a display screen is also provided on the front surface of the printing device 1. The operating unit 125 is configured of a touchscreen, for example. Through touching operations on the touchscreen, a user can perform various settings for the printing by the printing device 1 and can enter various input information. The input information entered through operations on the operating unit 125 is outputted to a controller 10 via an input unit 126 (see FIG. 3).

The input unit 126 receives such input information as the size of each sheet P, information related to the type of the sheets P accommodated in the sheet supply tray 21 (normal paper, glossy paper, thick paper, and the like), and inputs indicating whether to execute conveyance of the sheet P (first sheet P1, or the second sheet P2).

As illustrated in FIG. 2, the printing device 1 further includes, inside the lower housing 200B, a sheet feed roller 23, a sheet feed arm 24, a first conveying passage R1, first conveyer rollers 60 and 62, a reversing roller 64, a second conveyer roller 68, a first flap 46, a second flap 48, a second conveying passage R2, an image recording unit 3, the cutter unit 100, and a sheet guide portion 300. The numbers of rollers provided along the first conveying passage R1 and the second conveying passage R2 may be arbitrary and suitably changed.

The sheet feed roller 23 functions to convey the sheets P accommodated in the sheet supply tray 21 to the first conveying passage R1. The sheet feed roller 23 is rotatably supported on a distal end portion of the sheet feed arm 24. The sheet feed arm 24 is pivotably supported on a shaft 25 which is supported by a frame (not illustrated) of the printing device 1. The sheet feed roller 23 is configured to rotate forward in response to driving of a sheet feed motor 17 (see FIG. 3). The sheets P accommodated in the sheet tray 11 are delivered one by one to the first conveying passage R1 by the forward rotation of the sheet feed roller 23.

The first conveying passage R1 is a path that extends from a rear end of the sheet supply tray 21 toward the discharging tray 22. The first conveying passage R1 extends upward from the rear end of the sheet supply tray 21, curving in a region defined by guide members 41 and 42, and then extends straight past the position of the image recording unit 3 (described later) and through a region defined by a guide member 43.

The first conveyer roller 60 is disposed along the first conveying passage R1 upstream of the image recording unit 3 in a first conveying direction D1. A pinch roller 61 is disposed below the first conveyer roller 60 to face the first conveyer roller 60. The first conveyer roller 60 is configured to rotate in response to driving of a conveyer motor 18 (see FIG. 3). The pinch roller 61 is rotated following the rotation of the first conveyer roller 60. The sheet P is conveyed in the first conveying direction D1 by the forward rotation of the first conveyer roller 60 and the pinch roller 61, while being nipped therebetween, toward the image recording unit 3.

The image recording unit 3 is disposed along the first conveying passage R1 between the first conveyer roller 60 and the first conveyer roller 62, and is configured to record images on the sheets P. The image recording unit 3 includes a carriage 31, a recording head 32, a plurality of nozzles 33, and a platen 34. The recording head 32 is mounted on the carriage 31. The recording head 32 has a lower surface on which the plurality of nozzles 33 is provided, and is configured to eject ink droplets through the nozzles 33.

The platen 34 is a rectangular plate-shaped member that supports the sheet P being conveyed along the first conveying passage R1. The image recording unit 3 records an image on the sheet P supported on the platen 34 by controlling the recording head 32 to eject ink droplets selectively through the nozzles 33 as the carriage 31 is moved relative to the sheet P.

Upon receipt of a driving force of a carriage motor 19 (see FIG. 3), the carriage 31 is reciprocally movable in directions orthogonal to the first conveying direction D1, i.e., along a widthwise direction of the sheet P. When recording an image on the sheet P, the controller 10 repeatedly alternates between a recording process to record an image for one line on the sheet P, and a line feed process to convey the sheet P by a prescribed conveyance amount.

In the recording process, the controller 10 controls the carriage 31 to be moved in the widthwise direction of the sheet P and controls the recording head 32 to eject ink through the nozzles 33 while conveyance of the sheet P is halted. In the line feed process, the controller 10 causes the first conveyer roller 60 and the first conveyer roller 62 to be rotated to feed the sheet P by the prescribed conveyance amount.

As illustrated in FIG. 2, the first conveyer roller 62 is disposed along the first conveying passage R1 at a position downstream of the image recording unit 3 in the first conveying direction D1. A spur roller 63 is disposed above the first conveyer roller 62 to face the same. The first conveyer roller 62 is configured to rotate in response to driving of a conveyer motor 18 (see FIG. 3). The spur roller 63 is rotated following the rotation of the first conveyer roller 62. When the first conveyer roller 62 and the spur roller 63 make forward rotation while the sheet P is nipped therebetween, the sheet P is conveyed in the first conveying direction D1.

The reversing roller 64 is disposed along the first conveying passage R1 at a position downstream of the first conveyer roller 62 in the first conveying direction D1. A spur roller 65 is disposed above the reversing roller 64 to face the same. The reversing roller 64 is configured to rotate in response to the driving of the conveyer motor 18. The spur roller 65 is rotatable along with the rotation of the reversing roller 64. When the reversing roller 64 and the spur roller 65 make forward rotation while the sheet P is nipped therebetween, the sheet P is conveyed toward the cutter unit 100.

On the other hand, when the reversing roller 64 and the spur roller 65 make reverse rotation (rotated in a direction opposite the direction when making forward rotation), the sheet P nipped between the reversing roller 64 and the spur roller 65 is conveyed in reverse onto the second conveying passage R2 along a lower surface of the first flap 46. In the second conveying passage R2, the sheet P is conveyed in a second conveying direction D2.

The first flap 46 is disposed on the first conveying passage R1 between the first conveyer roller 62 and the reversing roller 64. The first flap 46 is disposed near a branching position Y and opposes the guide member 43. The first flap 46 is supported by the platen 34 so as to be pivotally movable between a first state (indicated by solid a line in FIG. 2) and a second state (indicated by a dashed line in FIG. 2).

In the first state, the first flap 46 contacts the guide member 43 to close the first conveying passage R1. In the second state, the first flap 46 is pivotally moved downward from the first state and separated from the guide member 43 to allow the sheet P to be conveyed in the first conveying direction D1 through the first conveying passage R1.

The first flap 46 is urged upward by a coil spring 47. The coil spring 47 has one end connected to the first flap 46, and another end connected to the platen 34. Due to an urging force of the coil spring 47, the first flap 46 is maintained in the first state with its distal end contacting the guide member 43.

Figure 4:
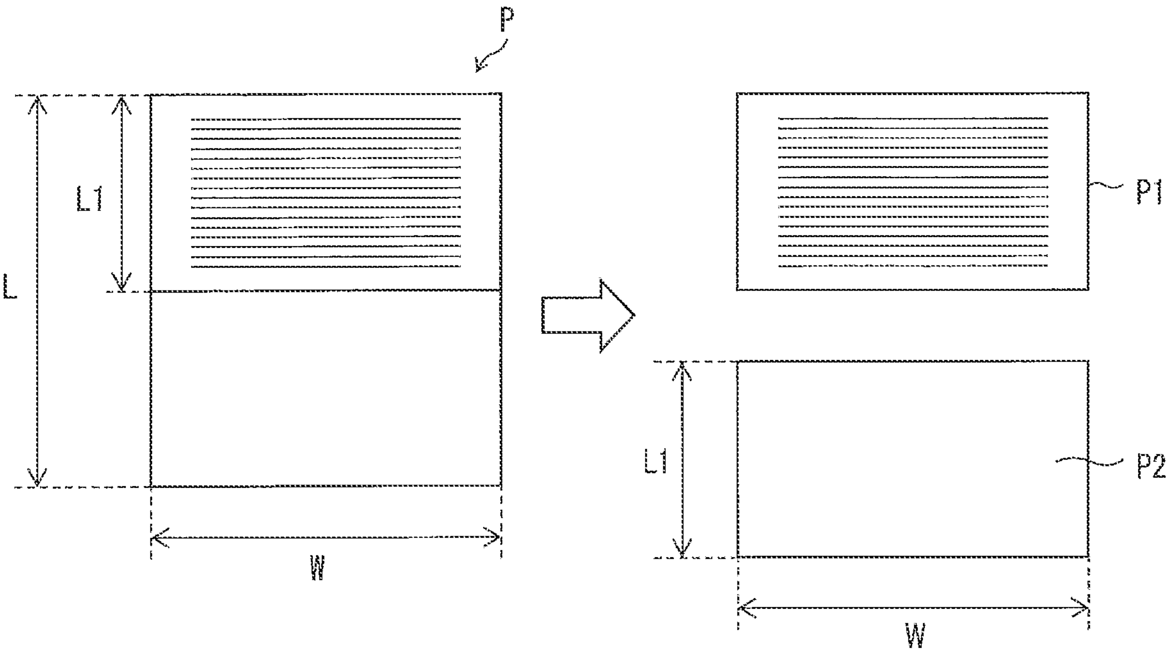
FIG. 4 is a view illustrating an example where a sheet P is cut into a first sheet P1 and a second sheet P2 in the printing device 1 according to the embodiment.

The cutter unit 100 is positioned downstream of the reversing roller 64 in the first conveying passage R1. The cutter unit 100 has a well-known cutter mechanism for cutting the sheet P on which an image is recorded by the image recording unit 3. Specifically, in the cutter unit 100, the sheet P conveyed by the reversing roller 64 and the spur roller 65 is cut at a prescribed position in the sheet P (hereinafter referred to as "cutting position") along the widthwise direction of the sheet P by moving a blade holding portion 107 (described later) relative to the sheet P in the widthwise direction thereof. When the controller 10 determines that the sheet P needs to be cut, the controller 10 controls the cutter unit 100 to cut the sheet P in half at the cutting position, thereby dividing the sheet P into the first sheet P1 and the second sheet P2, as illustrated in FIG. 4.

The sheet guide portion 300 is positioned below a region of the first conveying passage R1 between the reversing roller 64 and a cutter blade passing line (cutter blade 101) of the cutter unit 100. As will be described later, the sheet guide portion 300 is pivotable between a first position (illustrated in FIG. 2) and a second position displaced downward from the first position (illustrated in FIG. 5).

The sheet guide portion 300 has a guide surface 300P extending in the widthwise direction (the leftward/rightward direction) of the sheet P so as to face the sheet P. In the first position of the sheet guide portion 300, the guide surface 300P is sloped to decrease a distance therefrom to the first conveying passage R1 toward downstream in the first conveying direction D1. Hence, the sheet P conveyed by the reversing roller 64 in the first conveying direction D1 is guided by the guide surface 300P toward the cuter blade passing line of the cutter unit 100.

The sheet P or the first sheet P1 moved past the cutter unit 100, and the second sheet P2 cut by the cutter unit 100 are discharged onto the discharge tray 22.

As illustrated in FIG. 2, the second flap 48 is pivotally movably disposed at a merging position X between the first conveying passage R1 and the second conveying passage R2. Specifically, the second flap 48 is pivotally movable between a first state (indicated by a solid line in FIG. 2), and a second state (indicated by a dashed line in FIG. 2).

When the second flap 48 is in the first state, the second flap 48 and the guide member 42 constitute a portion of the second conveying passage R2. When the second flap 48 is in the second state, the second flap 48 and the guide member 41 constitute a portion of the first conveying passage R1.

A registration sensor 120 is disposed on the first conveying passage R1 at a position upstream of the first conveyer roller 60 in the first conveying direction D1. The registration sensor 120 is a sheet edge sensor. That is, the registration sensor 120 is configured to detect when a leading edge or a trailing edge of a sheet P passes a position for contacting the first conveyer roller 60. The registration sensor 120 may be a sensor provided with an actuator that pivots when contacted by a sheet P, or a photosensor, for example.

The registration sensor 120 is configured to output an ON signal while a sheet P is passing the position of the registration sensor 120 and to output an OFF signal while a sheet P is not passing the position of the registration sensor 120. Hence, the registration sensor 120 outputs an ON signal from a timing when the leading edge of a sheet P reaches the position of the registration sensor 120 to a timing when the trailing edge of the same sheet P passes the position of the registration sensor 120; and outputs an OFF signal at all other times. Detection signals from the registration sensor 120 are outputted to the controller 10.

A rotary encoder 121 (see FIG. 3) is provided on the first conveyer roller 60 for detecting the rotation of the first conveyer roller 60. The rotary encoder 121 is configured to output a pulse signal to the controller 10 according to the rotation of the first conveyer roller 60. The rotary encoder 121 includes an encoder disc, and an optical sensor. The encoder disc is rotatable in accordance with the rotation of the first conveyer roller 60. The optical sensor is configured to generate a pulse signal while reading the rotating encoder disc, and to output the pulse signal to the controller 10.

In the present embodiment, the rotary encoder 121 is used as a sensor for detecting a conveyance amount of the second sheet P2. The controller 10 can detect the conveyance amount of the second sheet P2 on the second conveying passage R2 based on the output from the rotary encoder 121 and the gear ratio of the first conveyer roller 60 to the second conveyer roller 68.

The second conveying passage R2 is a path defined by guide members 71, 72, and 73; the second conveyer roller 68 and a pinch roller 69 (described later), and the like. The second conveying passage R2 branches from the first conveying passage R1 at the branching position Y upstream of the reversing roller 64 and reconnects to the first conveying passage R1 at the merging position X upstream of the image recording unit 3 in the first conveying direction D1.

As illustrated in FIG. 2, a second sheet sensor 123 is provided at the second conveying passage R2. The second sheet sensor 123 is configured to output an ON signal to the controller 10 when a second sheet P2 is present at a position of the second sheet sensor 123 on the second conveying passage R2, and to output an OFF signal to the controller 10 when a second sheet P2 is not present at the position of the second sheet sensor 123. That is, the second sheet sensor 123 outputs an ON signal from a timing when a leading edge of a second sheet P2 reaches the position of the second sheet sensor 123 to a timing when a trailing edge of the same second sheet P2 passes the position of the second sheet sensor 123; and outputs an OFF signal at all other times.

In the printing device 1 thus constructed, as illustrated in FIG. 2, the discharge tray 22 is positioned below the cutter unit 100 during an image recording operation, i.e., in a state where the discharge tray 22 is set in the printing device 1. The discharge tray 22 is detachable in the frontward direction from the lower housing 200B. The discharge tray 22 is attachable to the lower housing 200B in the rearward direction. Therefore, even if the cutter unit 100 is involved with any trouble such as sheet jamming, a user can approach the region near the cutter unit 100 from a front side thereof by detaching the discharge tray 22 in the frontward direction. Hence, there is no need to form a dedicated opening nor to provide an opening/closing mechanism for the cutter unit 100 to solve the trouble ambient to the cutter unit 100. Consequently, a compact and simple printing device 1 can be provided.

Figure 3:
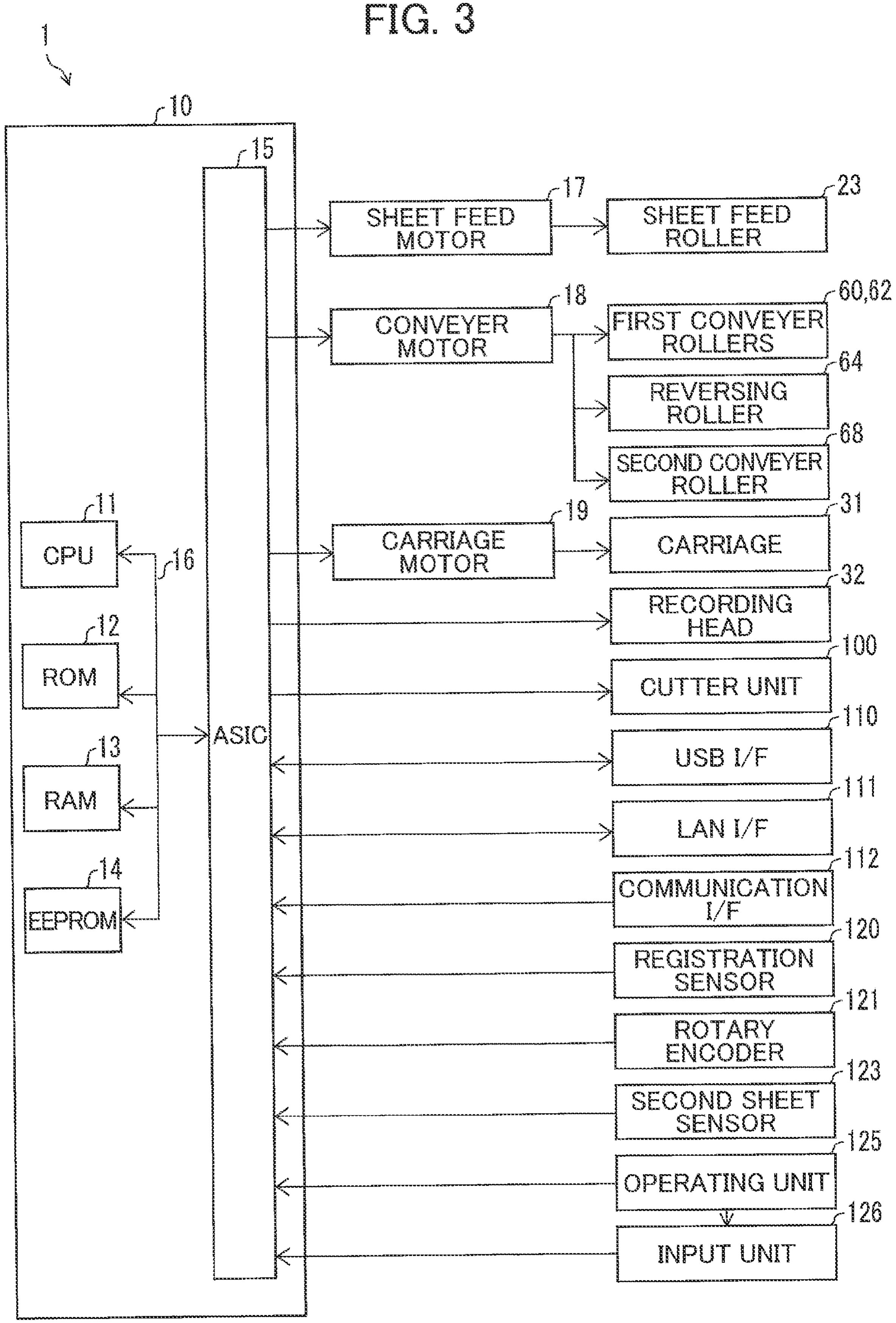
FIG. 3 is a block diagram illustrating an electrical configuration in the printing device 1 according to the embodiment.

FIG. 3 is a block diagram illustrating an electrical configuration of the printing device 1 according to the present embodiment. In addition to the sheet feed motor 17, the conveyer motor 18, the carriage motor 19, and the controller 10 described above, the printing device 1 includes a USB interface 110, a LAN interface 111, and a communication interface 112, as illustrated in FIG. 3.

The controller 10 includes a central processing unit (CPU) 11, a read-only memory (ROM) 12, a random-access memory (RAM) 13, an EEPROM 14 (registered trademark), and an application-specific integrated circuit (ASIC) 15 that are all interconnected via an internal bus 16.

The ROM 12 stores therein programs and the like with which the CPU 11 executes various operations. The RAM 13 is used as a storage area for temporarily storing data signals and the like used when the CPU 11 executes the programs described above, and as a work area for data processing. The EEPROM 14 stores therein settings information that must be preserved after power to the printing device 1 is turned off. The controller 10 controls the sheet feed motor 17, the conveyer motor 18, the carriage motor 19, the recording head 32, the cutter unit 100, and the like based on a control program read from the ROM 12.

The ASIC 15 is connected to the sheet feed motor 17, the conveyer motor 18, the carriage motor 19, the recording head 32, the cutter unit 100, the USB interface 110, the LAN interface 111, the communication interface 112, the registration sensor 120, the rotary encoder 121, the second sheet sensor 123, the operating unit 125, and the input unit 126. The ASIC 15 supplies drive currents to the sheet feed motor 17, the conveyer motor 18, and the carriage motor 19. The controller 10 drives the sheet feed motor 17, the conveyer motor 18, and the carriage motor 19 through, for example, pulse width modulation (PWM) control.

The controller 10 also applies drive voltages to oscillation elements in the recording head 32 to eject ink droplets through the nozzles 33. Since the ASIC 15 is also connected to the registration sensor 120, the rotary encoder 121, and the second sheet sensor 123, the controller 10 can detect a state of the printing device 1 based on signals outputted from the registration sensor 120, the rotary encoder 121, and the second sheet sensor 123.

Specifically, the controller 10 detects whether a sheet P or a second sheet P2 have passed the contact position with the first conveyer roller 60 based on the detection signal outputted from the registration sensor 120. The controller 10 also detects a rotated amount of the first conveyer roller 60 based on pulse signals outputted from the rotary encoder 121. The controller 10 estimates the conveyance amount of the sheet P along the first conveying passage R1 (equivalent to "L1" in FIG. 4) based on the pulse signals outputted from the rotary encoder 121 after the registration sensor 120 outputted an ON signal. The controller 10 also detects whether a second sheet P2 is present on the second conveying passage R2 based on the detection signal outputted from the second sheet sensor 123.

A USB memory or a USB cable can be connected to the USB interface 110. When a USB memory is connected to the USB interface 110, the controller 10 receives image data stored in the USB memory via the USB interface 110. When a USB cable is connected to the USB interface 110, the USB interface 110 receives a print job from a PC (personal computer) connected to the other end of the USB cable.

When a LAN cable is connected to the LAN interface 111, the controller 10 can receive a print command from a PC connected to the LAN interface 111. Note that, although the USB interface 110 and the LAN interface 111 are used as examples in the present embodiment, a print job may also be received through wireless communication. Upon receiving a print job via the USB interface 110 or the LAN interface 111, the controller 10 controls the components in the printing device 1 to record an image corresponding to a print command contained in the print job on sheets P.

<Outline of Printing Process and Cutting Process>

Next, outline of a printing process and a cutting process performed in the printing device 1 according to the embodiment will be described.

In the printing device 1, the sheet P having a predetermined size (for example, A4 size) is subjected to recordation of an image having a size (for example A5 size) smaller than the size of the sheet P by the image recording unit 3, and then, the sheet P is cut by the cutter unit 100. Hence, the sheet P is divided into the first sheet P1 and the second sheet P2. The first sheet P1 and the second sheet P2 thus divided are discharged onto the discharge tray 22.

Incidentally, the controller 10 may perform such a control that: the first sheet P1 separated from the second sheet P2 is discharged to the discharge tray 22; and the second sheet P2 is conveyed to the second conveying passage R2. With this control, the second sheet P2 is retained in the second conveying passage R2 as illustrated in FIG. 2 so that the second sheet P2 can be utilized in a subsequent printing operation. Specifically, in this case, the second sheet P2 is conveyed to the second conveying passage R2 such that a trailing end in the first conveying direction D1 of the second sheet P2 conveyed along the first conveying passage R1 becomes a leading end of the second sheet P2 in the second conveying passage R2; and thereafter the second sheet P2 is conveyed to the image recording unit 3 for image formation with the second sheet P2 flipped from a state thereof in the first conveying passage R1. In this way, the second sheet P2 divided out from the sheet P can be used for another printing operation. Further, both-side printing can also be performed on the second sheet P2 when flipping of the second sheet P2 is performed twice.

In the example of FIG. 4, the cutter unit 100 cuts the sheet P to divide the sheet P into a first sheet P1 and a second sheet P2 each being one half the size of the sheet P. That is, assuming that the sheet P has a length L and a width W, each of the first sheet P1 and second sheet P2 has a length L1, which is one half of the length L, and the same width Was the sheet P. Cutting the sheet P after image recording in this way produces the first sheet P1 having an image recorded thereon and the second sheet P2 having no image recorded thereon. Accordingly, the blank second sheet P2 can be reused for a subsequent printing operation.

Incidentally, in the example of FIG. 4, the sheet P is cut in half. However, the cutting position for the sheet P may be adjusted according to the sheet size in the print data. For example, the first sheet P1 cut from the sheet P may be one-third the size of the original sheet P.

<Details of Sheet Guide Portion 300 and Cutter Unit 100>

Next, structures of the sheet guide portion 300 and the cutter unit 100 will be described in detail mainly with reference to FIGS. 6A and 6B.

As described earlier, the sheet guide portion 300 is configured such that a position of the sheet guide portion 300 is switchable between the first position and the second position displaced downward from the first position. In the first position, the sheet guide portion 300 guides the sheet P that is positioned between the image recording unit 3 and the cuter unit 100 (the cutter blade 101).

Figure 5:
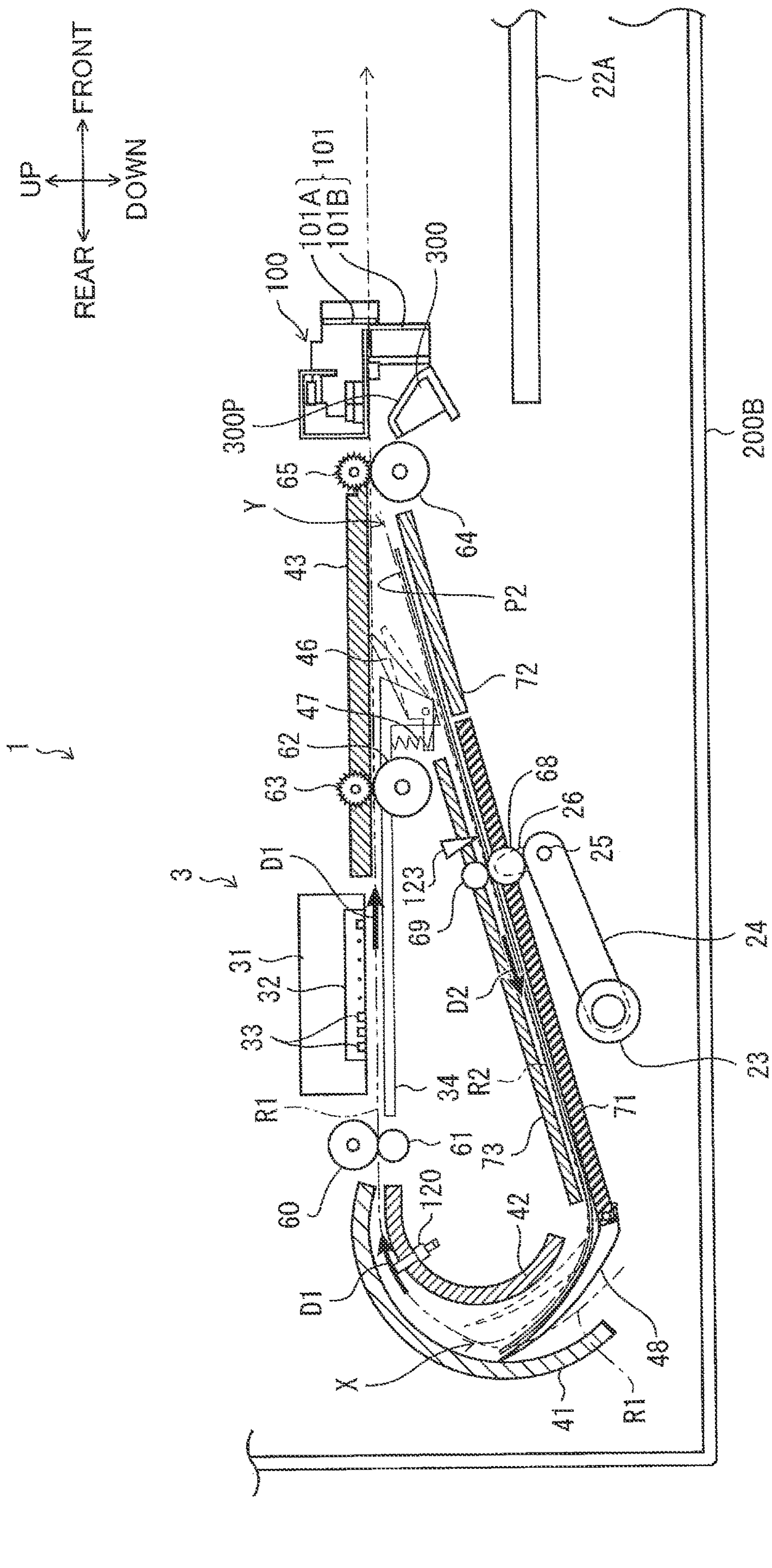
FIG. 5 is a cross-sectional view illustrating a state where a sheet guide portion 300 is moved to a second position from a first position illustrated in FIG. 2.

FIG. 2 illustrates the sheet guide portion 300 positioned at the first position. FIG. 5 illustrates the sheet guide portion 300 positioned at the second position (delineation of the sheet supply tray 21, the discharge tray 22 and the upper housing 200A is omitted for simplification). Further, FIGS. 6A and 6B are enlarged cross-sectional views illustrating the sheet guide portion 300, the cuter unit 100, and configurations ambient thereto. Specifically, FIG. 6A illustrates a state where the sheet guide portion 300 is at the first position, and FIG. 6B illustrates a state where the sheet guide portion 300 is at the second position.

The cuter unit 100 includes the cutter blade 101 and a cutting guide portion 102. The cutter blade 101 is held by the blade holding portion 107 described later. Referring to FIG. 2, the cutter blade 101 is positioned below the upper housing 200A and above the discharge tray 22, and between upstream and downstream ends of the discharge tray 22 in the first conveying direction D1. With this configuration, the cutter blade 101 (cutter unit 100) can be accommodated inside the lower housing 200B, thereby making printing device 1 compact.

The cutting guide portion 102 is a guide member extending in the widthwise direction (the leftward/rightward direction) of the sheet P. The blade holding portion 107 is movable in the widthwise direction of the sheet P while being guided by the cutting guide portion 102.

Figure 6A:
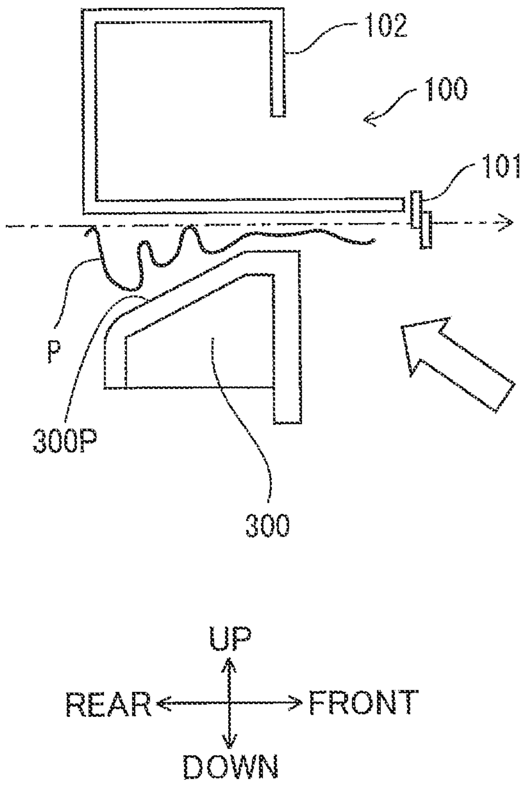
FIG. 6A is an enlarged cross-sectional view illustrating a portion near the sheet guide portion 300 and a cutter unit 100 of the printing device 1 according to the embodiment, and particularly illustrating a state where the sheet guide portion 300 is at the first position.
Figure 6B:
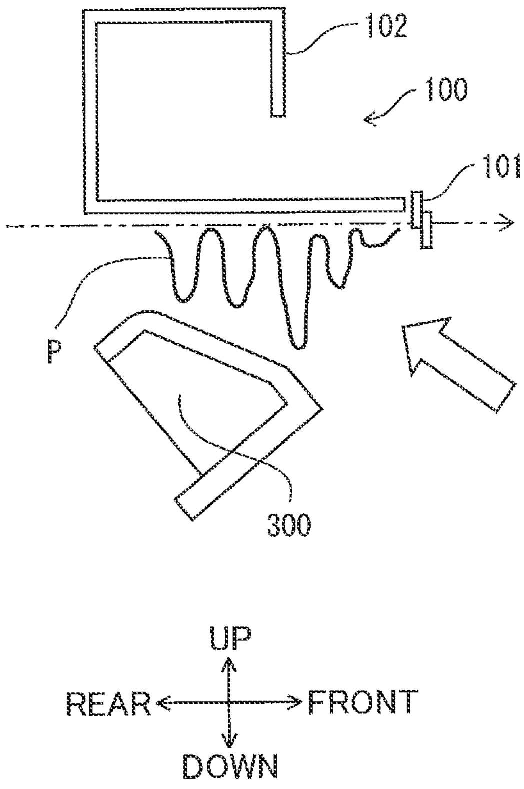
FIG. 6B is an enlarged cross-sectional view illustrating the portion near the sheet guide portion 300 and the cutter unit 100 of the printing device 1 according to the embodiment, and particularly illustrating a state where the sheet guide portion 300 is at the second position.

As illustrated in FIGS. 6A and 6B, the cutting guide portion 102 is positioned above a conveying path of the sheet P (indicated by two-dotted chain lines), that is, above the position of the sheet P at the time of the cutting operation. Hence, the cutting guide portion 102 does not become an obstacle in the path of a user to approach the region adjacent to the cuter unit 100 from the front side of the printing device 1 (as indicated by arrows in FIGS. 6A and 6B) after removal of the discharge tray 22 positioned below the cuter unit 100.

The sheet guide portion 300 is normally at the first position for use. In this state, assume that a jamming of the sheet P occurs at a position adjacent to the cuter unit 100 as illustrated in FIG. 6A. Accordingly, the sheet guide portion 300 is likely to be an obstacle against the user accessing the portion adjacent to the cuter unit 100 from the front side (as indicated by the arrow in FIG. 6A). However, as illustrated in FIG. 6B, the sheet guide portion 300 can be moved to the second position from the first position at the time of occurrence of a paper jam. That is, the sheet guide portion 300 is moved downward such that a distance between the cutting guide portion 102 and the sheet guide portion 300 is increased. Accordingly, this structure can facilitate user's access from the front side (as indicated by the arrow in FIG. 6B) to the sheet P jammed adjacent to the cuter unit 100.

Incidentally, moving the sheet guide portion 300 in case of occurrence of sheet jamming is described above. However, moving the sheet guide portion 300 may also be performed, for example, when chip of the sheet P is stagnated around the cuter unit 100, or when the sheet P is stuck or engaged with the cuter unit 100 to facilitate user's access to the region near the cutter unit 100.

Further, as illustrated in FIGS. 6A and 6B, the cutter blade 101 is positioned at a downstream side of the cutting guide portion 102 in the conveying direction of the sheet P, that is, the cutter blade 101 is positioned frontward of the cutting guide portion 102. With this structure, an increased distance between the reversing roller 64 and the blade holding portion 107 (supporting the cutter blade 101) can be provided, in comparison with a structure where the blade holding portion 107 is positioned rearward of the cutting guide portion 102. As a result, the sheet P jammed between the reversing roller 64 and the blade holding portion 107 can be easily removed; and exchange of the blade holding portion 107 can also be easily performed.

Further, at least a part of the cutting guide portion 102 is overlapped with the sheet guide portion 300 in the upward/downward direction. That is, a layout region of the cutting guide portion 102 in the frontward/rearward direction can be overlapped with a layout region of the sheet guide portion 300 in the frontward/rearward direction. With this structure, the printing device 1 can have a reduced size in the frontward/rearward direction, in comparison with a structure where the cutting guide portion 102 and the sheet guide portion 300 are arranged offset from each other in the frontward/rearward direction.

<Switching in Position of Sheet Guide Portion 300>

Next, a mechanism for switching the positions of the sheet guide portion 300 will be described mainly with reference to FIGS. 7A through 8.

Figure 7A:
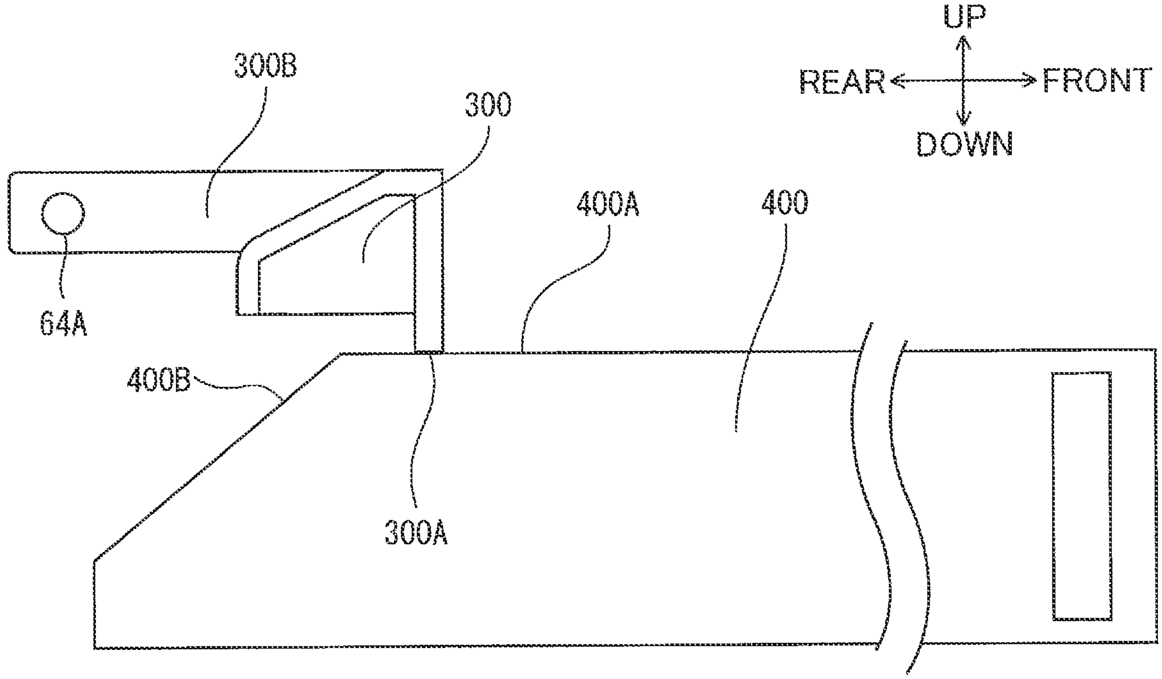
FIGS. 7A and 7B are views illustrating a switching mechanism for switching the sheet guide portion 300 between the first position and the second position in the printing device 1 according to the embodiment.
Figure 7B:
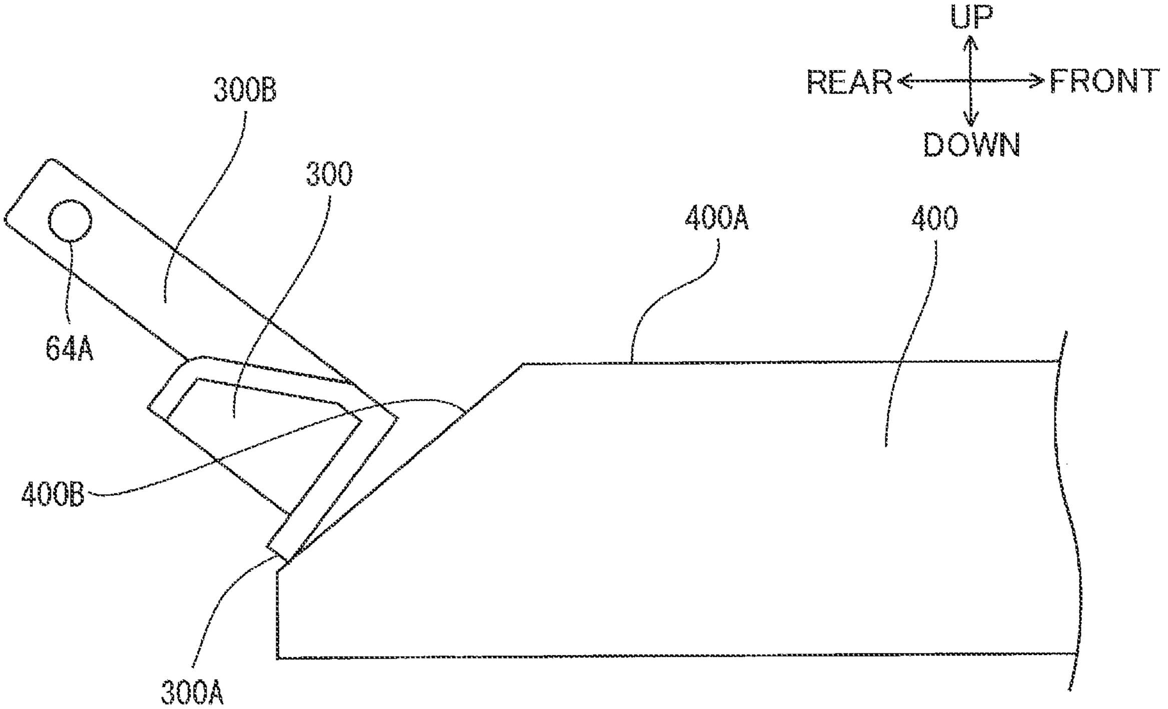

FIGS. 7A and 7B are views illustrating the switching mechanism as viewed from a left side thereof. FIG. 8 is a front view of the printing device 1 in a state where the sheet supply tray 21 and the discharge tray 22 are detached.

Figure 8:
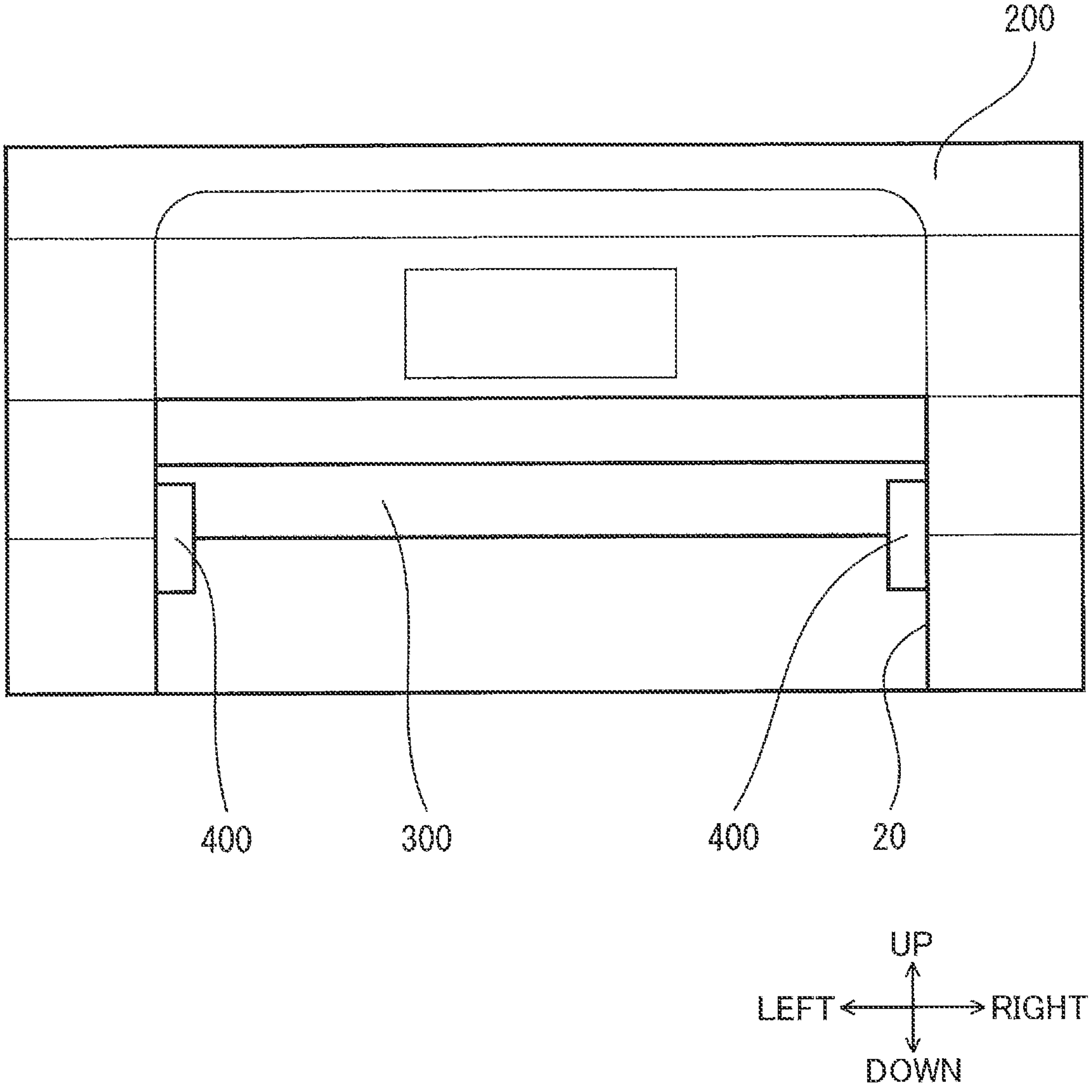
FIG. 8 is a front view of the printing device 1 according to the embodiment in a state where a sheet supply tray 21 and a discharge tray 22 are detached.

As illustrated in FIG. 8, a pair of release rods 400 is provided at the lower housing 200B of the printing device 1. Each release rod 400 is positioned at each end portion in leftward/rightward direction of the lower housing 200B. The release rods 400 are positioned to face respective end portions of the sheet guide portion 300 in the leftward/rightward direction. The release rods 400 are movable in the frontward/rearward direction so that the release rods 400 can make contact with a lower portion of the sheet guide portion 300, as illustrated in FIG. 7A.

Each release rod 400 has an upper surface 400A, and an inclined surface 400B extending diagonally rearward and downward from a rear end of the upper surface 400A. At the time of an ordinary use, the lower portion (lower end 300A) of the sheet guide portion 300 is seated on the upper surfaces 400A of the release rods 400 so that the sheet guide portion 300 is held at the first position. On the other hand, when the release rod 400 is moved frontward by a user, the lower end 300A of the sheet guide portion 300 comes into contact with the inclined surface 400B of each release rod 400 because of own weight of the sheet guide portion 300, thereby moving the sheet guide portion 300 downward to be placed at the second position. That is, the sheet guide portion 300 is switched from the first position (where the lower end 300A is in contact with the upper surfaces 400A) to the second position (where the lower end 300A is in contact with the inclined surfaces 400B), in accordance with the frontward movement of the release rods 400.

The sheet guide portion 300 is connected to a pair of sheet guide arms 300B that is pivotably supported on a pivot shaft 64A. The sheet guide arms 300B are provided one each at respective left and right end portions of the sheet guide portion 300. Each sheet guide arm 300B is pivotally movable about the pivot shaft 64A. Hence, the sheet guide portion 300 is pivotable between the first position and the second position by the pivotal movement of sheet guide arm 300B about the pivot shaft 64A.

The pivot shaft 64A may be a rotation shaft of the reversing roller 64 illustrated in FIG. 2. In this case, since the shaft 64A serves both as the rotation shaft of the reversing roller 64 and as the pivot shaft of the sheet guide portion 300, a simple and compact device can be realized.

Incidentally, switching of the sheet guide portion 300 between the first position and the second position may be performed by a manner other than the pivotal movement described above. For example, a guide rail may be provided so that the sheet guide portion 300 may be guided to one of the first position and the second position.

According to the switching mechanism described above, in a case where jamming of the sheet P occurs, the sheet guide portion 300 can be moved from the first position to the second position by user's pulling of the release rods 400 frontward. Further, the sheet guide portion 300 can be moved back from the second position to the first position by user's pushing of the release rods 400 rearward.

Incidentally, in the above-described embodiment, the release rods 400 are used as the switching mechanism. However, the switching mechanism is not limiting. For example, the discharge tray 22 may have surfaces corresponding to the upper surface 400A and the inclined surface 400B of each release rod 400 to provide the switching mechanism. In the latter case, the sheet guide portion 300 can be moved from the first position to the second position by user's pulling operation of the discharge tray 22, and the sheet guide portion 300 can be moved from the second position to the first position by user's inserting operation of the discharge tray 22.

<Detailed Structure of the Cutter Unit 100>

Next, a structure of the cuter unit 100 will be described with reference to FIGS. 9A to 9C.

Figure 9A:
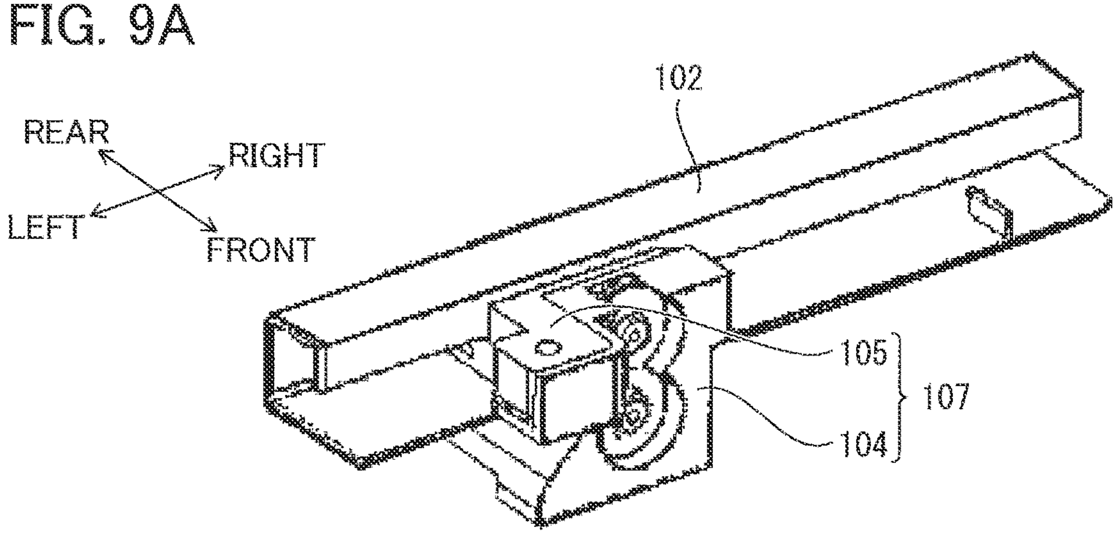
FIG. 9A is a perspective view of the cutter unit 100 in the printing device 1 according to the embodiment.
Figure 9B:
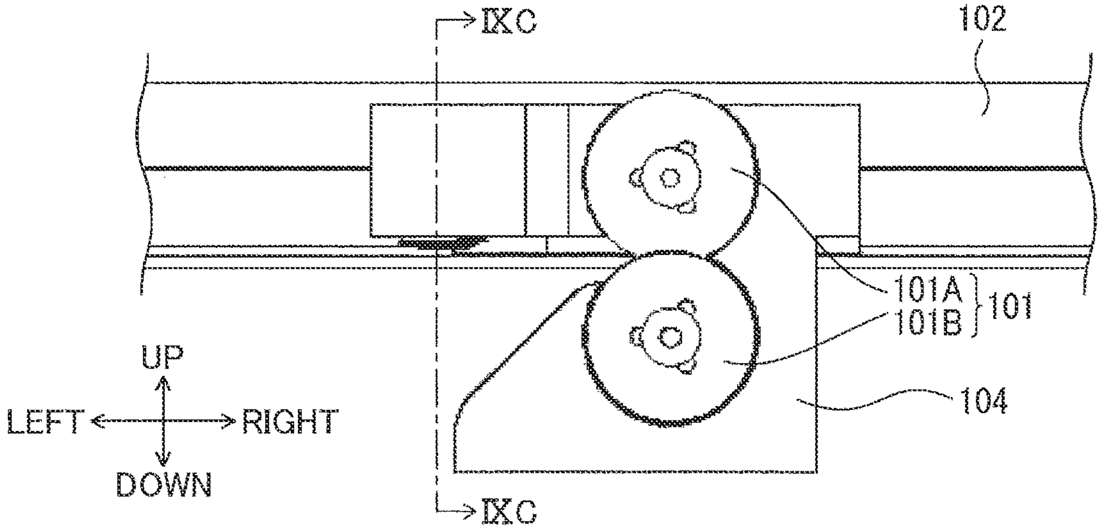
FIG. 9B is a partially enlarged front view of the cutter unit 100 in the printing device 1 according to the embodiment.
Figure 9C:
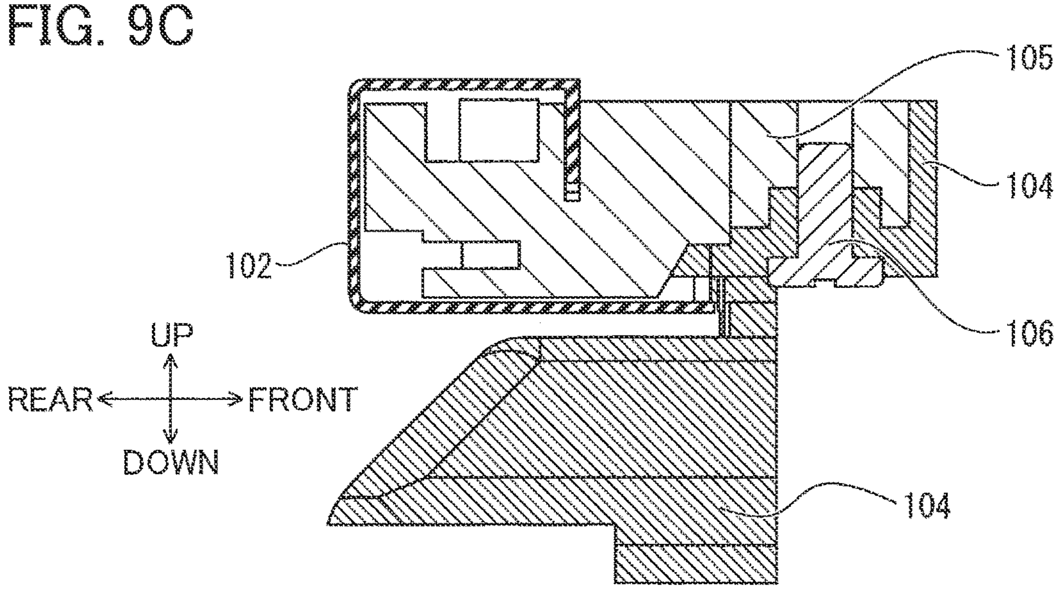
FIG. 9C is a cross-sectional view of the cutter unit 100 taken along a line IXC-IXC in FIG. 9B.

FIGS. 9A to 9C illustrate a structure of the cuter unit 100. FIG. 9A is a perspective view of the cuter unit 100. FIG. 9B is a partially enlarged front view of the cuter unit 100. FIG. 9C is a cross-sectional view of the cutter unit 100 taken along a line IXC-IXC in FIG. 9B.

In the cuter unit 100, the blade holding portion 107 is movable in the leftward/rightward direction along the cutting guide portion 102.

As illustrated in FIG. 9B, the blade holding portion 107 supports a first rotary blade 101A and a second rotary blade 101B. The first rotary blade 101A and the second rotary blade 101B together constitute the cutter blade 101. Specifically, the first rotary blade 101A and the second rotary blade 101B are positioned such that blade edges of the first rotary blade 101A and the second rotary blade 101B are overlapped with each other in the upward/downward direction. In FIG. 9B, as the blade holding portion 107 moves leftward, the first rotary blade 101A and the second rotary blade 101B together cut the sheet P (not illustrated) that is positioned leftward of the blade holding portion 107.

Incidentally, although not illustrated in FIGS. 9A-9C, an endless belt looped over a rotation shaft is provided in the cutting guide portion 102. The endless belt is connected to the blade holding portion 107. Upon rotation of the rotation shaft by driving force from a motor (not illustrated), the endless belt is circularly moved, so that the blade holding portion 107 is moved along the cutting guide portion 102 in a scanning direction, i.e., in the leftward/rightward direction.

As illustrated in FIGS. 9A and 9C, the blade holding portion 107 includes an upper holder member 105, a lower holder member 104, and a thread member 106. The upper holder member 105 is engaged with the cutting guide portion 102, and the lower holder member 104 holds the cutter blade 101. The upper holder member 105 is positioned above the lower holder member 104. The upper holder member 105 and the lower holder member 104 are fastened to each other by the thread member 106 as a fastener.

The thread member 106 has a head portion facing downward of the blade holding portion 107. That is, screw fastening (fastening operation) and screw loosening (unfastening operation) with the thread member 106 are performed at the lower side of the blade holding portion 107. In other words, the blade holding portion 107 and the cutting guide portion 102 are connected to each other by the thread member 106. The thread member 106 can switch in state thereof between a fastening state and a loosened state from the lower side of the blade holding portion 107.

With this structure, a user can perform screwing and unscrewing of the thread member 106 from the lower side of the blade holding portion 107, after removing the discharge tray 22 positioned below the cuter unit 100 to allow user's access to the region adjacent to the cutter unit 100 from the front side of the printing device 1. Therefore, the user can easily perform attachment/detachment of the lower holder member 104 of the blade holding portion 107 for the exchange of the cutter blade 101.

Incidentally, in the described embodiment, the head portion of the thread member 106 faces downward relative to the blade holding portion 107. However, the head portion of the thread member 106 need not face vertically downward, but may face diagonally frontward, for example. Further, instead of the thread member 106, a button or a slide bar may be available as the fastener which is switchable between the fastening state and the loosened state. Further, the structure for fastening the upper holder member 105 and the lower holder member 104 to each other need not be a screw as in the described embodiment, but any structure is available as long as the structure is switchable from the fastening state to the loosened state and vice versa.

<Modifications>

Figure 10A:
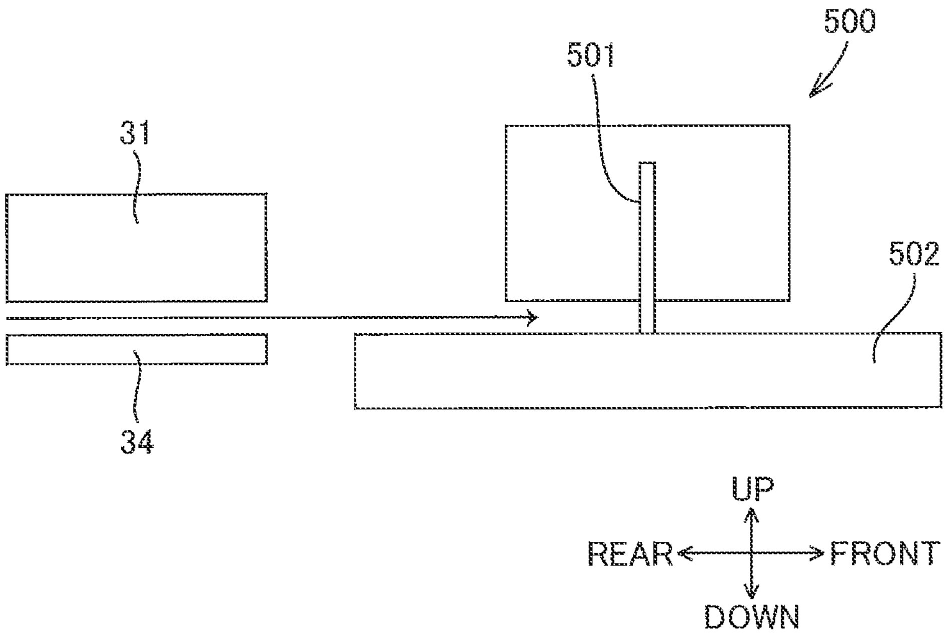
FIG. 10A is a schematic view of a processing unit 500 according to a variation to the embodiment.
Figure 10B:
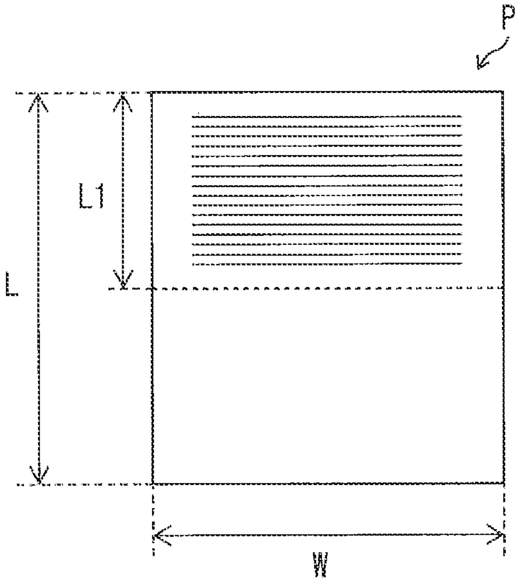
FIGS. 10B and 10C are views illustrating examples of processing performed on a sheet P by the processing unit 500 according to the variation.
Figure 10C:
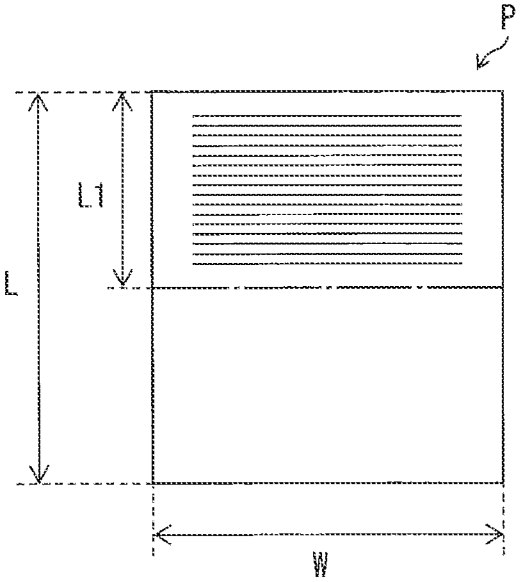

The cutter unit 100 according to the embodiment includes the cutter blade 101 for cutting the sheet P completely into two separate sheets, the first sheet P1 and second sheet P2. However, the sheet P need not be completely cut into two separate sheets. For example, instead of the cutter unit 100, a processing unit 500 may be provided in the lower housing 200B to perform processing other than cutting. Referring to FIGS. 10A through 10C, the processing unit 500 may include a rotary blade (or a rotary plate) 501 and a sheet support portion 502 positioned below the rotary blade 501 to support the sheet P thereon. In this processing unit 500, the rotary blade 501 may form a perforated line (see FIG. 10B) or a folding line (see FIG. 10C) on the sheet P while the sheet P conveyed from the carriage 31 is supported on the sheet support portion 502.

While the description has been made in detail with reference to the embodiments, it would be apparent to those skilled in the art that many modifications and variations may be made thereto.

REMARKS

The printing device 1 is an example of a printing device. The sheet P is an example of a printing medium. The image recording unit 3 is an example of an image recording unit. The cutter unit 100 is an example of a cutter unit. The discharge tray 22 is an example of a medium receiving portion. The blade holding portion 107 is an example of a blade holding portion. The cutting guide portion 102 is an example of a cutting guide portion. The first conveyer rollers 60, 62 and the reversing roller 64 are examples of a conveying unit. The sheet guide portion 300 is an example of a medium guide portion. The release rod 400 is an example of a switching mechanism. The thread member 106 is an example of a fastener. The sheet supply tray 21 is an example of a medium accommodation unit. The lower housing 200B is an example of a housing, and is also an example of a lower housing. The cutter blade 101 is an example of a cutter blade, and an example of a processing part. The rotary blade (rotary plate) 501 is another example of a processing part. The upper housing 200A is an example of an upper housing. The cutter unit 100 and a processing unit 500 are an example of a processing unit. The extension tray 221 is an example of an extension tray.

What is claimed is:

1. A printing device comprising:
an upper housing;
a lower housing connected to the upper housing;
an image recording unit disposed in the lower housing and configured to record an image on a printing medium;
a processing unit comprising a processing part configured to perform processing on the printing medium on which the image is recorded by the image recording unit;
a conveying unit disposed in the lower housing and configured to convey the printing medium from the image recording unit to the processing unit in a conveying direction; and
a discharge tray configured to receive the printing medium on which the processing is performed by the processing part, the discharge tray having a downstream end and an upstream end opposite each other in the conveying direction,
wherein the processing part is positioned
below the upper housing and above the discharge tray in a vertical direction, and
between the upstream end and the downstream end of the discharge tray in the conveying direction.

2. The printing device according to claim 1,
wherein the upper housing comprises a scanner.

3. The printing device according to claim 1,
wherein the upper housing is pivotably connected to the lower housing.

4. The printing device according to claim 1, further comprising an accommodation tray configured to accommodate the printing medium to be conveyed to the image recording unit,
wherein the discharge tray is positioned above the accommodation tray.

5. The printing device according to claim 1,
wherein the processing part is a cutter blade configured to cut the printing medium on which the image is recorded by the image recording unit.

6. The printing device according to claim 1,
wherein the processing part is a rotary blade configured to form a perforated line on the printing medium on which the image is recorded by the image recording unit.

7. The printing device according to claim 1,
wherein the processing part is a rotary plate configured to form a folding line on the printing medium on which the image is recorded by the image recording unit.

8. The printing device according to claim 1, further comprising an extension tray retractably supported by the discharge tray.

* * * * *